United States Patent [19]

Ward, Jr.

[11] 4,441,582
[45] Apr. 10, 1984

[54] ESCAPE SLIDE SYSTEM AND METHOD OF OPERATION

[75] Inventor: James H. Ward, Jr., Plymouth, N.C.

[73] Assignee: The B. F. Goodrich Company, New York, N.Y.

[21] Appl. No.: 331,438

[22] Filed: Dec. 16, 1981

[51] Int. Cl.³ ............................................. B64D 25/14
[52] U.S. Cl. .................................. 182/48; 244/137 P
[58] Field of Search ............. 182/48, 49; 244/DIG. 2, 244/137 P; 193/25 B, 25 C, 5

[56] References Cited

U.S. PATENT DOCUMENTS

| | | | |
|---|---|---|---|
| 299,132 | 5/1884 | Haege | 182/74 |
| 3,463,287 | 8/1969 | Smith | 182/48 |
| 3,465,991 | 9/1969 | Banas | 182/48 |
| 3,633,853 | 11/1972 | Collins | 182/48 |
| 3,771,749 | 11/1973 | Smialowicz | 182/48 |
| 3,910,532 | 10/1975 | Fischer | 182/48 |
| 4,106,729 | 10/1978 | Bergman | 193/25 B |

*Primary Examiner*—Reinaldo P. Machado
*Assistant Examiner*—Alvin C. Chin-Shue
*Attorney, Agent, or Firm*—Michael J. Colitz, Jr.

[57] ABSTRACT

A packboard assembly (10) has a shell (12) in which the escape slide is packed and held in place by releasably fastened covers (28,29). The shell (12) is mounted on a door (44) and supported by latches (52) having latch pins (62) which when removed cause the assembly (10) to drop. The latch pins (62) are removed in response to opening of the door (44) after the escape slide system is actuated by an operator. Then after the packboard assembly (10) is dropped a predetermined distance a packing release lanyard (68) is tensioned to release the covers (28,29) and permit the shell (12) to fall away from the slide. A firing lanyard (78) then actuates the inflation of the slide.

8 Claims, 5 Drawing Figures

ESCAPE SLIDE SYSTEM AND METHOD OF OPERATION

BACKGROUND OF THE INVENTION

This invention relates to a packboard and escape slide system and especially to the packboard assemby and the mounting of the assembly on an aircraft door for releasing and deploying the escape slide during an emergency. Heretofore escape slides have been packed on a relatively flat board and mounted in the door so that upon actuation of the system and opening of the door the slide drops out of the bottom of the door and is then deployed.

The packing of the slides has sometimes been difficult because the profile of the packboard assembly must be shaped to fit in the door. There have also been problems due to the complicated installation procedures. The doors have had to be of a special design which increased the weight of the aircraft and the cost. It has also been difficult to remove and transfer the packboard assemblies for inspection and servicing.

SUMMARY OF THE INVENTION

The present invention is directed to a packboard assembly in which the slide is folded and packed in a shell with the profile maintained by the rigid sides of the shell. The shell is releasably mounted on the aircraft door and falls away from the airframe upon opening of the door to deploy the slide. Ease of installation, removal and portability are provided. The design and operation of this new system has resulted in a lightweight, relatively economical, packboard assembly which can be packed and installed easily and is reliable in performance.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

DETAILED DESCRIPTION

Figure 1:
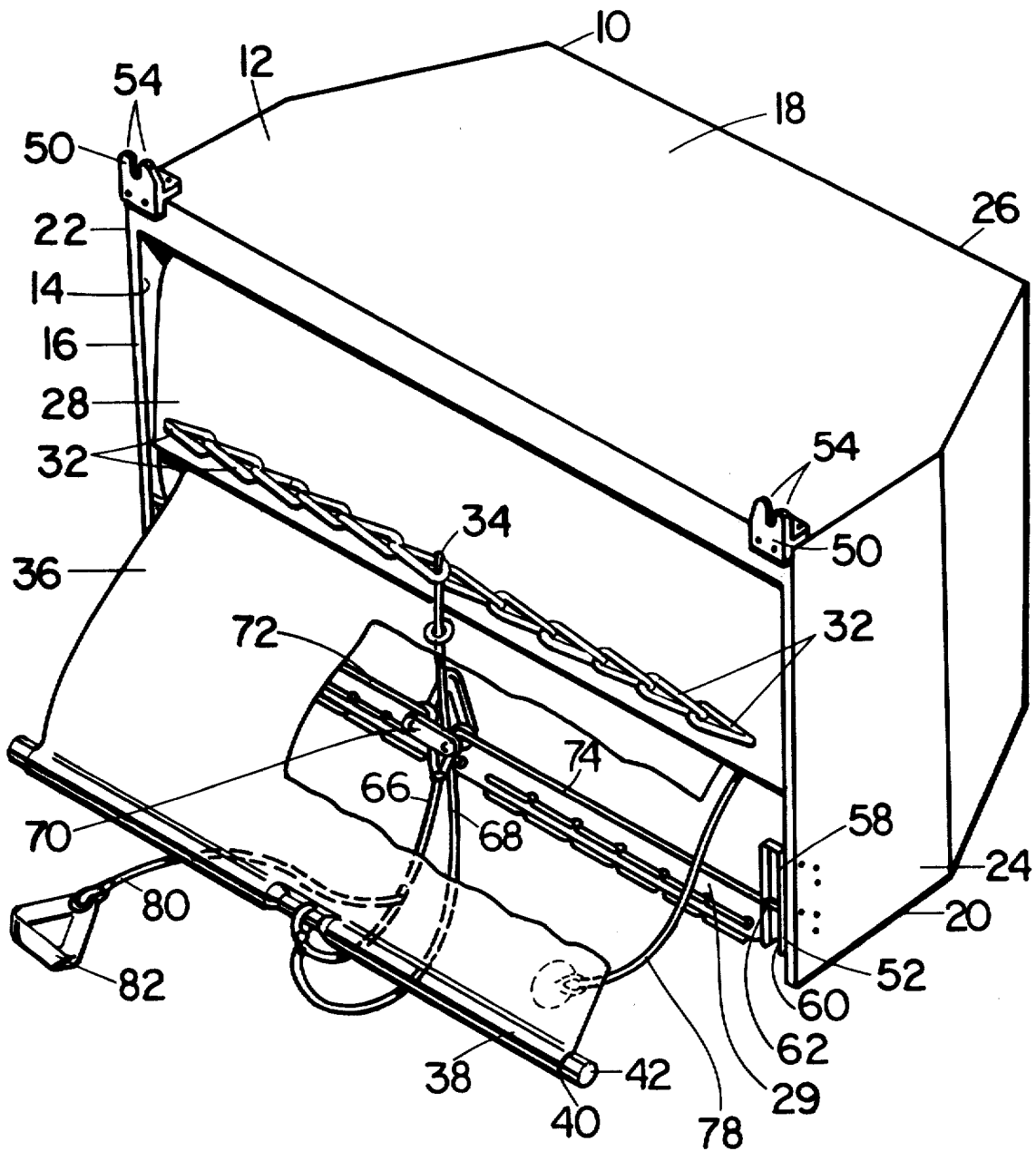
FIG. 1 is a view in perspective of the packboard assembly embodying the invention shown in condition for mounting on the aircraft door, and with parts being broken away to show the lanyard connections.

Referring to FIG. 1, a packboard assembly 10 is shown having a slide container or packboard shell 12 with an opening 14 at one of the sides 16 for receiving an escape slide in the folded condition. The slide is packed into the profile required which is maintained by the rigid top 18, bottom 20, ends 22,24, and other side 26. The shell 12 may be made of a rigid, lightweight, high-strength material such as reinforced resin. After the slide is packed in the shell 12, cover members such as fabric panels 28 and 29, which are permanently connected to the top 18 and bottom 20, respectively, are pulled over the slide and connected by a releasable fastener such as speed loops 32 woven between the panels and held in the fastened position by a lanyard pin 34.

A slide girt member such as girt 36 extends between the fabric panels 28 and 29 to a free end 38 which is folded back to form a girt pocket 40 for receiving a girt bar 42. The girt 36 may have holes corresponding to holes in the fabric panel 28 through which the speed loops 32 extend.

Figure 2:
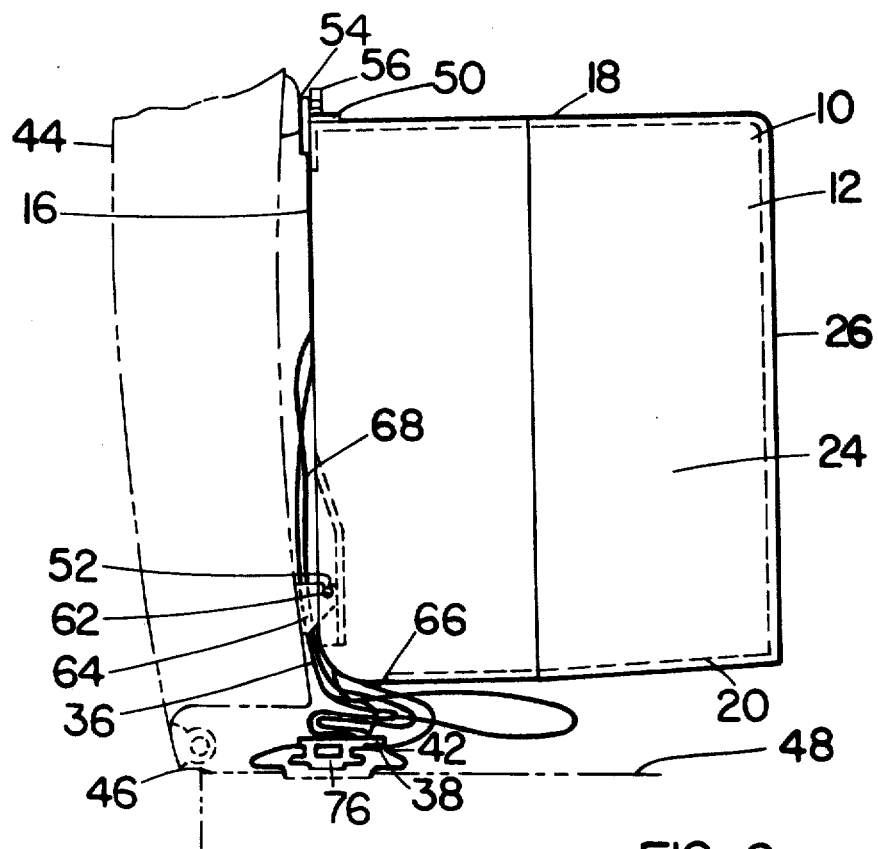
FIG. 2 is a side elevation of the packboard assembly as installed with the door and aircraft frame shown in chain-dotted lines.

Referring to FIG. 2, the packboard assembly 10 is shown mounted on a support member such as aircraft door 44, shown in chain-dotted lines, which is mounted for relative movement into and out of a doorway 46 of a frame member such as airframe 48 of an aircraft. The packboard assembly 10 is mounted on the door 44 by releasable mounting means including upper brackets 50 mounted on the top 18 and side 16 of the shell 12 and latches 52 mounted on the ends 22 and 24 adjacent the bottom 20 of the shell. The upper brackets 50 may include a bifurcated plate with flanges 54 extending upwardly for engagement with studs 56 threaded in the door 44. Each of the latches 52 includes a lower bracket having spaced side plates 58 and 60 with aligned holes for insertion of a latch pin 62 in the installed position as shown in FIGS. 1 and 2. A hook member 64 is mounted on the door 44 for positioning between the side plates 58 and 60 in supporting relationship with the latch pin 62 as shown more clearly in FIG. 2.

Slide release means such as lanyard means connecting the airframe 48 and the lanyard pin 34 and each of the latch pins 62 includes an automatic release cable 66 and a packing release lanyard 68. The packing release lanyard 68 is connected to the lanyard pin 34 and to the girt bar 42 with a cable of a predetermined length. The automatic release cable 66 is also connected to the girt bar 42 and extends through a lanyard guide 70 in the form of a left-hand cable 72 and a right-hand cable 74 which are connected to latch pin 62 in each of the latches 52. As shown in FIG. 2, the girt bar 42 and escape slide fixture 76 in the door sill is mounted on the airframe 48. A firing lanyard 78 is also provided to actuate inflating means such as a bottle of gas under pressure for operating an aspirator pump.

Figure 3:
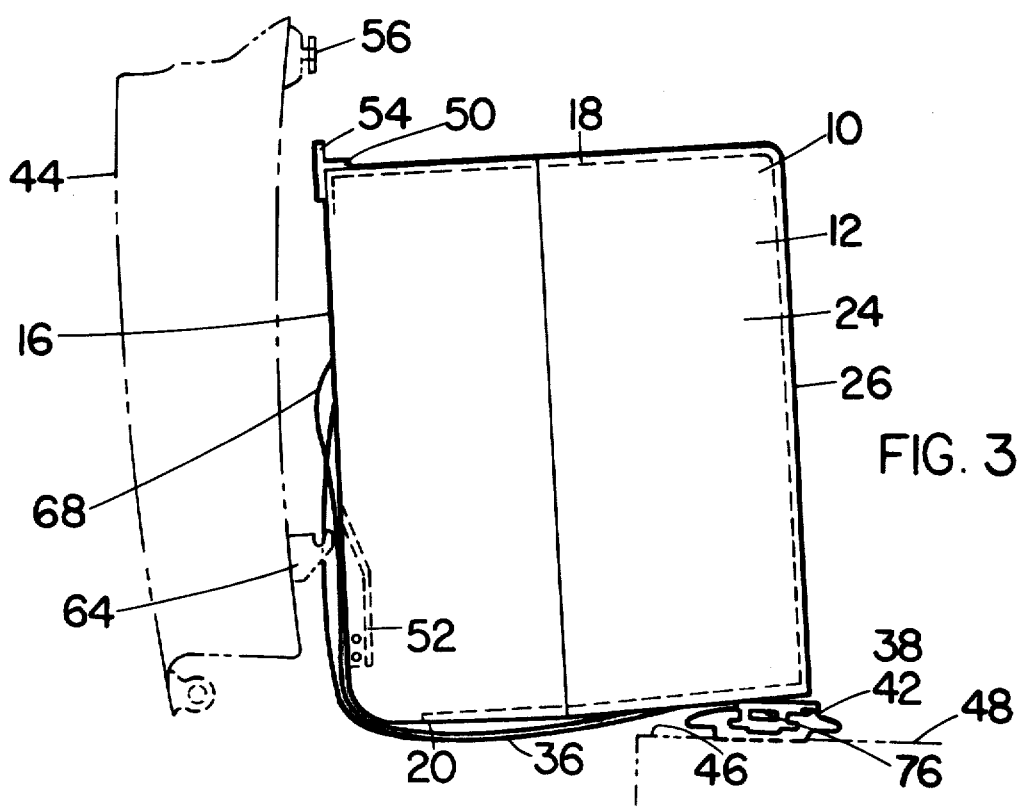
FIG. 3 is a view like FIG. 2 showing the position of the packboard assembly after the door is opened and the assembly is released from the door.
Figure 4:
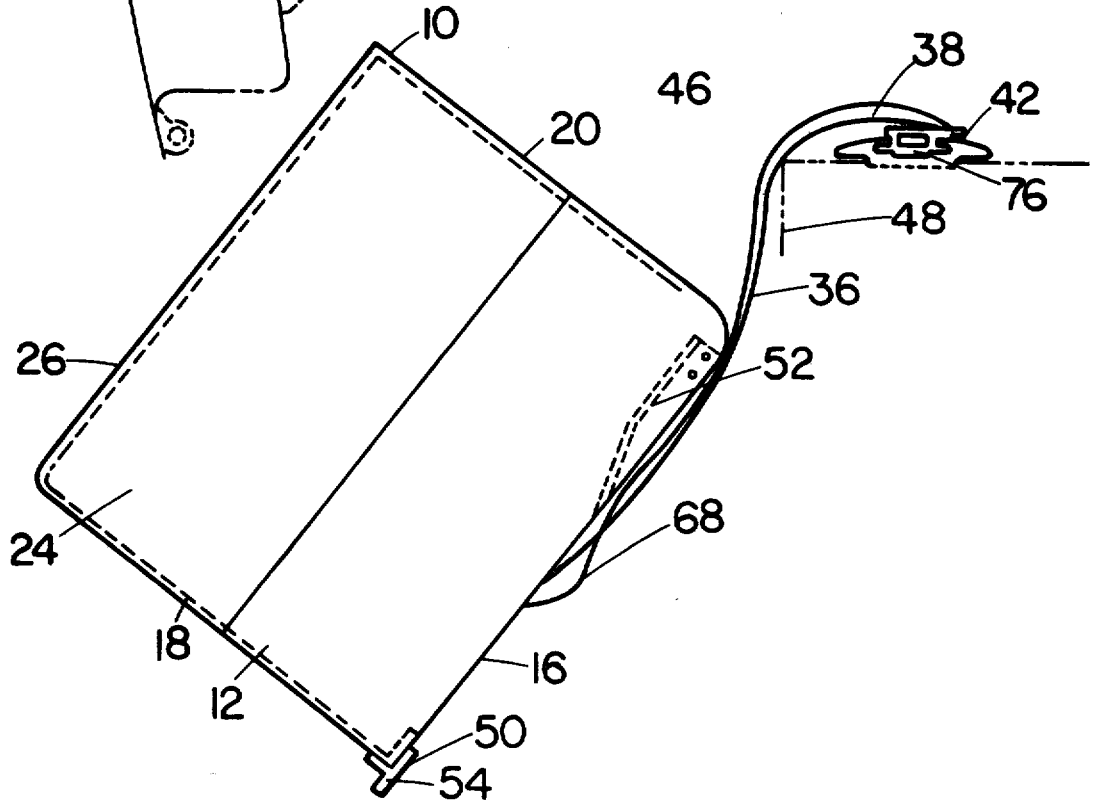
FIG. 4 is a view like FIG. 3 with the packboard assembly in a dropped position at which the packing release lanyard is extended for releasing the slide covers so that the packboard shell can fall away and the slide be inflated.

The fixture 76 is of the type which will remain attached to the airframe 48 when the escape slide system is actuated by an operator so that when the door 44 is pushed out of the doorway 46, as shown in FIG. 3, the girt bar 42 will tension the release cable 66 causing the left-hand cable 72 and right-hand cable 74 to pull the latch pin 62 from each of the latches 52 causing the packboard assembly 10 to fall to the sill. As the door 44 moves further away from the doorway 46 the packboard assembly 10 will roll over into the position shown in FIG. 4. In this position the packing release lanyard 68 will release the lanyard pin 34 and the speed loops 32 will then be pulled through the holes in the girt 36 and fabric panel 28 permitting the shell 12 to fall away from the slide which is attached to the girt 36.

When the bottle of inflating gas attached to the slide has dropped a sufficient distance from the airframe 48 after the lanyard pin 34 has been removed and the fabric panels 28,29 and girt 36 are released, the bottle will be fired and the slide inflated by gas from the bottle due to the extension of the firing lanyard 78. In this embodiment, the length of the firing lanyard 78 is approximately thirty inches. Also in accordance with this embodiment the shell 12 falls away from the slide and is not retained.

As shown in FIG. 1, a manual release cable 80 is connected to the automatic release cable 66 and has a handle 82 for manually pulling the latch pin 62 of each of the latches 52 out of the installed position so that the packboard assembly 10 can be removed from the door 44 for inspection and servicing. This is done without pulling the lanyard pin 34, the firing lanyard 78 or girt bar 42. These connections are disconnected separately from the airframe 48.

In operation, the packboard assembly 10 is prepared for mounting on the door 44 by folding the deflated escape slide and packing it through the opening 14 in the shell 12. The opening 14 is then closed by fastening the fabric panels 28 and 29 to the girt 36 by speed loops 32. The lanyard pin 34 is placed in the speed loops 32 to hold them in position. The pin 62 for each of the latches 52 is placed in the installed position through the side plates 58 and 60 and then the assembly 10 is lifted onto the hook members 64 and swung into position with the upper brackets 50 positioned so that the flanges 54 are positioned on each side of the holes in the door 44 for the studs 56. When in position the studs 56 are screwed into the door 44 and the manual release lanyard handle 82 is fastened to the bottom 20 of the shell 12 as by a velcro pad (not shown). The firing lanyard 78 and girt bar 42 are also fastened to the airframe 48.

When the escape slide is to be used the operator actuates the fixture 76 so that it remains fixed to the airframe 48 and pushes the door 44 out of the doorway 46 from the position shown in FIG. 2 to the position shown in FIG. 3. The automatic release cable 66 is tensioned causing the latch pin 62 of the latches 52 to be pulled from the aligned holes in the side plates 58 and 60 and causing the assembly 10 to fall to the sill as shown in FIG. 3. As the door 44 arcs forward to the position shown in FIG. 4, the packboard assembly 10 rolls out into the position shown in FIG. 4. The length of the packing release lanyard 68 is such that at this predetermined distance the lanyard pin 34 will be pulled out releasing the speed loops 32 and thereby unfastening the fabric panels 28 and 29 from the girt 36. This frees the shell 12 from the escape slide so that it can fall away and the slide can be inflated. When the firing lanyard 78 is extended approximately thirty inches, the bottle of inflating gas will be actuated and the slide inflated.

Figure 5:
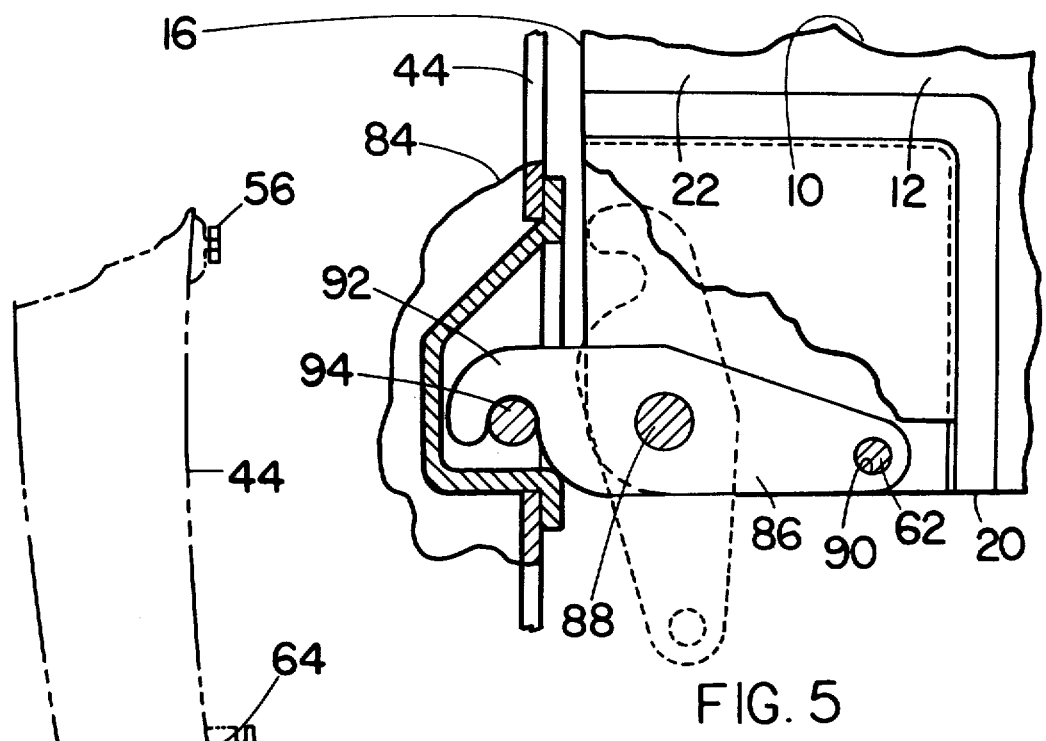
FIG. 5 is a fragmentary view of a modified form of latch for releasably mounting the packboard assembly on the door with the release hook shown in the released position in dotted lines.

Referring to FIG. 5, a modified latch 84 is shown in which a release hook 86 is pivotally mounted on a pivot pin 88 at each end 22',24' of the shell 12'. This description is of the latch 84 at the left-hand side of the packboard assembly 10' as shown in FIG. 1 and applies to the latch at the right-hand side which is a mirror image of the latch at the left-hand side. In the hooked position shown in full lines in FIG. 5, the release hook 86 has a latch pin hole 90 in alignment with holes in the shell 12' for receiving a latch pin 62' which may be fastened to the left-hand cable 72' in a similar manner to that shown and described for the embodiment of FIGS. 1 through 4.

The release hook 86 has a hook portion 92 for engagement with a supporting shaft 94 mounted on the door 44'. In operation the automatic release cable 66' is pulled and the left-hand cable 72' and right-hand cable 74' then pull the latch pins 62' out of the latch pin hole 90 in each of the latches 84 and release the hook 86 so that it will move to the released position shown in dotted lines in FIG. 5. The packboard assembly 10' will then drop to the position shown in FIG. 3 and the escape slide will be released in the same manner as described for the embodiment of FIGS. 1 through 4.

With the foregoing disclosure in mind, many and varied obvious modifications of this invention will become readily apparent to those of ordinary skill in the art.

I claim:

1. An escape slide system comprising a slide container, an opening in said container for receiving a slide in the deflated folded condition, a frame member, a door mounted for movement into and out of a doorway in said frame member with said container being mounted on the inside surface of said door for storage in said doorway, releasable mounting means connecting said slide container and said door, said mounting means including an upper bracket mounted on said container, said upper bracket having a bifurcated plate with flanges extending upwardly for engagement with a stud extending outwardly from said door toward said container, said slide having a girt member fastened to said frame member, and slide release means responsive to movement of said door relative to said frame member to actuate said releasable mounting means and disconnect said container from said door whereby said slide is released from said container as it falls away from said door and said frame member, said slide release means including lanyard means connecting said frame member and said releasable mounting means, said lanyard means having an automatic release cable for actuating said releasable mounting means in response to movement of said door out of said doorway, said releasable mounting means including a latch connected to said automatic release cable and supporting said container on said door in an installed position, said latch being actuated by said automatic release cable upon opening of said door to release said container, said latch including a slidable latch pin connected to said automatic release cable and supporting said door in said installed position, said latch pin being pulled from said installed position by said automatic release cable upon opening of said door, and said flanges being movable out of engagement with said stud when said pin is pulled out of said installed position.

2. An escape slide system according to claim 1 wherein said mounting means includes a lower bracket on said container having spaced side plates with aligned holes for insertion of said pin in said installed position and a hook member mounted on said door for positioning between said side plates and in supporting relationship with said latch pin so that upon pulling of said latch pin out of said installed position in said aligned holes in said side plates said container will no longer be supported and will drop relative to said door.

3. An escape slide system according to claim 1 wherein said mounting means includes a release hook mounted on said container for rotation about a pivot pin, said release hook being rotatable from a hooked position to a released position, a supporting shaft mounted on said door for engagement with said hook portion in said hooked position and a latch pin movable into an installed position through aligned holes in said release hook and said container in the hooked position to prevent rotation of said release hook, and said latch pin being connected to said automatic release cable for pulling out of said latch pin from said installed position in response to movement of said door out of said doorway to permit rotation of said release hook to said released position.

4. An escape slide system according to claim 1 wherein said lanyard means includes a manual release cable attached to said automatic release cable for manually pulling said latch pin out of said installed position.

5. An escape slide system comprising a slide container, an opening in said container for receiving a slide in the deflated folded condition, a frame member, a door mounted for movement into and out of a doorway in said frame member with said container being mounted on the inside surface of said door for storage in said doorway, releasable mounting means connecting said slide container and said door, said slide having a girt member fastened to said frame member, and slide release means responsive to movement of said door out of said doorway to actuate said releasable mounting means and disconnect said container from said door so that said container falls to a sill of said doorway and rolls out into a position at a predetermined distance below said door, said container having an opening for inserting said slide, at least one cover member held over said opening by a releasable fastener for retaining said slide in said container in the folded condition and said releasable fastener being actuated by a packing release lanyard connecting said frame and said releasable fastener, said packing release lanyard having a length such that at said predetermined distance of said container below said door said slide release means will be actuated to uncover said opening so that said container can fall away and said slide can be inflated.

6. A method of storing and releasing an inflatable escape slide comprising packing a folded slide through an opening in a container, releasably mounting said container on a door mounted for movement into and out of a doorway in a frame member, fastening a girt member of said slide to said frame member, moving said door out of said doorway with said container to actuate the releasable mounting and thereby disconnect said container from said door permitting said container to fall away from said door and frame member, said opening being closed by at least one cover member held over said opening by a releasable fastener, said releasable fastener being actuated after the falling of said container a predetermined distance from said door to release said cover member and permit said container to fall away from said slide, and said slide being pulled out of said container as it falls by said girt member fastened to said frame member.

7. The method of claim 6 wherein said releasable mounting of said container includes a latch having a container supporting latch pin in the installed position and pulling said latch pin out of the installed position to permit said container to fall away from said door.

8. The method of claim 6 wherein said slide is inflated by inflating means attached to said slide and said inflating means is actuated after said releasable fastener is actuated for removing the folded slide from said container.

* * * * *